(12) United States Patent
Haseba et al.

(10) Patent No.: US 7,583,966 B2
(45) Date of Patent: Sep. 1, 2009

(54) MOBILE COMMUNICATIONS SYSTEM, RADIO NETWORK CONTROLLER, AND ACTIVE SET CONTROL METHOD

(75) Inventors: Yukio Haseba, Tokyo (JP); Daisuke Kondo, Tokyo (JP); Emiko Sakuma, Tokyo (JP); Osami Nishimura, Tokyo (JP); Hisashi Kawabata, Tokyo (JP); Motoya Iwasaki, Tokyo (JP)

(73) Assignee: NEC Corporation, Tokyo (JP)

( * ) Notice: Subject to any disclaimer, the term of this patent is extended or adjusted under 35 U.S.C. 154(b) by 415 days.

(21) Appl. No.: 11/378,250

(22) Filed: Mar. 20, 2006

(65) Prior Publication Data

US 2006/0223538 A1 Oct. 5, 2006

(30) Foreign Application Priority Data

Mar. 30, 2005 (JP) .............................. 2005-099572

(51) Int. Cl.
*H04W 36/00* (2009.01)
(52) U.S. Cl. ..................... 455/436; 455/438; 455/439; 455/67.11; 455/435.1; 455/443; 455/115.1; 455/67.14; 370/331; 709/200
(58) Field of Classification Search ......... 455/436–443, 455/435.1, 115.1, 67.14, 67.11; 370/331; 709/200
See application file for complete search history.

(56) References Cited

U.S. PATENT DOCUMENTS 6,553,231 B1 * 4/2003 Karlsson et al. ............. 455/436

2005/0044130 A1 2/2005 Sillasto et al.
2005/0215201 A1 * 9/2005 Cao et al. ................ 455/67.11
2006/0223538 A1 * 10/2006 Haseba et al. ............... 455/436

FOREIGN PATENT DOCUMENTS

| EP | 1 377 101 A1 | 1/2004 |
|---|---|---|
| JP | 2000-197092 | 7/2000 |
| JP | 2003-189368 | 7/2003 |
| JP | 2003-224875 | 8/2003 |

OTHER PUBLICATIONS

European Search Report dated Jul. 20, 2006.

* cited by examiner

*Primary Examiner*—Dwayne Bost
*Assistant Examiner*—Pierre-Louis Desir
(74) *Attorney, Agent, or Firm*—McGinn IP Law Group, PLLC

(57) ABSTRACT

An active set control method for handover operation in a CDMA communications system in which propagation conditions of an uplink channel and a downlink channel for an access link of cell are different, provides that when a cell is deleted from the active set based on a request of a base station which has detected a degraded signal of the uplink channel, a predetermined period of time is to be counted for inhibiting addition of the same cell in the active set based on a request of a mobile terminal which has detected a satisfied signal of the downlink channel, thereby preventing the deletion and addition of the cell in the active set from successive operations in a short time.

8 Claims, 8 Drawing Sheets

MOBILE COMMUNICATIONS SYSTEM, RADIO NETWORK CONTROLLER, AND ACTIVE SET CONTROL METHOD

BACKGROUND OF THE INVENTION

1. Field of the Invention

The present invention relates to a control of addition and deletion to and from an active set used in a handover control method in a CDMA (Code Division Multiple Access) mobile communications system, and particularly relates to a mobile communications system, a radio network controller and an active set control method for performing active set control in a system in which a high-speed signal is introduced in an uplink radio channel from a mobile terminal to a base station.

2. Description of the Conventional Art

A mobile terminal in a CDMA (Code Division Multiple Access) mobile communications system is capable of simultaneously setting up radio channels between the mobile terminal and a plurality of base stations. In the CDMA mobile communications system, a new radio channel from the mobile terminal to a base station is established before old radio links from the mobile station to other base stations are removed when the mobile station performs handover. The mobile terminal keeps its connection to the other end during the handover operation because the mobile terminal keeps at least one radio link to one of the base stations even when the mobile terminal is performing handover.

A radio network controller (RNC: Radio Network Controller) in the CDMA mobile communications system manages radio channels, which are set between a mobile terminal and each of the base stations during handover, by using active sets of respective mobile terminals. An active set is a list of cells in each of which a mobile terminal sets radio channels (an access link) during handover. The content of the active set varies in accordance with the movement of a mobile terminal during handover. More specifically, a cell included in the active set is deleted or added depending on the location of the mobile terminal which is moving.

The active set is not a list of base stations, but instead, includes a list of cells. The reason thereof is as follows.

If one base station always corresponds to one cell, handover in which the mobile terminal moves from a cell to another cell means handover from a certain base station to another certain base station. However, one base station does not always correspond to one cell. In a case in which one base station forms a plurality of cells with a plurality of directional antennas, the base station corresponds to the plurality of cells. If a cell from which a mobile terminal moves and a cell to which the mobile terminal moves belong to the same base station, then handover between the base stations is not performed even though the mobile terminal performs handover between cells. To deal with such a case, it is necessary that the active set is not a list of base stations to which the mobile terminal sets up radio channels, but instead, includes a list of cells in which the mobile terminals set up radio channels. Additionally, as would be clear to the ordinarily skilled artisan from the above descriptions, the cell included in the list of the active set does not mean an area where effective radio signals reach a base station, but instead, indicates a radio channel which is set up corresponding to the cell between the mobile terminal and the base station.

Descriptions of a conventional handover in the CDMA mobile communications system will be exemplarily described with reference to FIG. 5. FIG. 5 illustrates the CDMA mobile communications system including a radio network controller (RNC: Radio Network Controller) 140 and base stations 120 and 130. Each of the base stations 120 and 130 is connected to the radio network controller 140. The radio network controller 140 is a host apparatus which, for example, sets up radio channels each between a mobile terminal 110 and any of the base stations 120 and 130, and controls handover operations between the base stations 120 and 130. FIG. 5 shows a case where the mobile terminal 110 was in a cell 121 of the base station 120 and moves to a cell 131 of the base station 130.

Descriptions of conventional technologies in operations of active set control, such as the active set selecting method for selecting a cell to be included in the active set, are providing by JP 2000-197092 A, JP 2003-189368 A, and JP 2003-24875 A, which describe conventional methods relating to the operations of active set control, each of which is incorporated herein by reference in their entirety. There are two conventional types of operations for adding/deleting a cell (an access link) to/from the active set. FIGS. 6 and 7 are schematic views respectively for explaining the respective types.

Operations for active set control of a conventional example 1 are for controlling addition/deletion of a cell to/from the active set initiated by the mobile terminal which measures a signal power of a downlink reference channel from each base station. With reference to FIG. 6, detailed descriptions will be provided below of the operations of the conventional example 1, using the case in which the mobile terminal 110 moves from the cell 121 of the base station 120 to the cell 131 of the mobile station 130.

(1) The mobile terminal 110 has a radio channel linked in cell 121. Simultaneously, the mobile terminal 110 periodically measures a downlink reference signal power of the neighboring cell 131.

(2) When the downlink reference signal power of the cell 131 becomes larger, the mobile terminal 110 sends an event trigger (a radio channel setup request signal) for adding the cell 131 to the active set to the radio network controller 140 through the existing radio channel between the mobile terminal 110 and the base station 120.

(3) Upon receiving the event trigger from the mobile terminal 110, the radio network controller 140 sends, to each of the base station 130 and the mobile terminal 110, a radio channel setup signal for setting up a radio channel of the cell 131. The radio network controller 140 also adds the cell 131 to the active set of the mobile terminal 110 in the active set table.

(4) Upon receiving the radio channel setup signal from the radio network controller 140, the base station 130 and the mobile terminal 110 set up a radio channel of cell 131 and start communications on the radio channel of cell 131. Then, the sequence of operations for adding the cell 131 to the active set is completed.

(5) When a downlink signal power of the cell 121 becomes smaller because the mobile terminal has moved from the cell 121 to the cell 131, the mobile terminal 110 sends an event trigger (a radio channel release request signal) for deleting the cell 121 from the active set to the radio network controller 140 through any one of the existing radio channels each between the mobile terminal 110 and any one of the base stations 120 and 130.

(6) Upon receiving the event trigger from the mobile terminal 110, the radio network controller 140 sends, to the base station 120 and the mobile terminal 110, a radio channel release signal for releasing the radio channel of the cell 121. The radio network controller 140 also deletes the cell 121 from the active set of the mobile terminal 110 in the active set table.

(7) Upon receiving the radio channel release signal from the radio network controller 140, the base station 120 and the mobile terminal 110 release the radio channel of the cell 121, between them. Then, the sequence of operations for deleting the cell 121 from the active set is completed.

Operations for active set control of a second way, the conventional example 2 is for controlling a deletion of a cell from the active set initiated by the base station which monitors a receiving condition of an uplink high-speed signal from the mobile terminal. With reference to FIG. 7, detailed descriptions will be provided of the operations of the conventional example 2, using the case where the mobile terminal 110 moves from the cell 121 of base station 120 to the cell 131 of base station 130.

(1) Each of the base stations 120 and 130 respectively forms the cells 121 and 131, which are included in the active set of the radio network controller 140, and measures a received SIR (Signal to Interference power Ratio) of an uplink high-speed signal transmitted from the mobile terminal 110. Each of the base stations 120 and 130 monitors a difference between the received SIR and a target SIR which satisfies the minimum requirement of communications quality for the radio channels and which the radio network controller 140 has provided to the base stations 120 and 130.

(2) When the received SIR becomes lower than a deletion SIR threshold level from the active set (a level determined based on the target SIR) and this state continues for a certain protection time, the base station 120 sends, to the radio network controller 140, a radio channel release request signal for releasing a radio channel of cell 121 (a radio channel of uplink high-speed signal), presuming that the mobile terminal 110 has started sending the uplink high-speed signal in accordance with a rate control signal of the other base station 130 (see FIG. 8).

(3) Upon receiving the radio channel release request signal from the base station 120, the radio network controller 140 sends, to each of the base station 120 and the mobile terminal 110, the radio channel release signal for releasing the radio channel of the cell 121.

(4) Upon receiving the radio channel release signal from the radio network controller 140, each of the base station 120 and the mobile terminal 110 releases the radio channel (the radio channel of uplink high-speed signal) between the mobile terminal 110 and the base station 120. Then, the sequence of operations for deleting the cell 121 from the active set is completed.

In a practical environment of the CDMA communications system, an uplink channel and a down link reference channel (or a rate control signal) have different propagation environments because of a difference in phasing (fluctuations of received signal strength) conditions caused by a difference in frequencies between the uplink high-speed signal and the downlink reference signal (or the rate signal), a difference in interference conditions between the uplink high-speed signal and the downlink reference signal (or the rate control signal), and the like.

For this reason, in the operations in the conventional example 1, it happens that the access link remains in the active set because the downlink channel is satisfying receiving strength for the mobile terminal even if the uplink channel have been degraded and the uplink channel does not work for communications any longer, whereby radio resources are wasted. Effective use of radio resources is strongly required especially under such a coming circumstance that the uplink high-speed channel is used to transmit a large amount of data such as moving images at high speed from the mobile terminal. Since radio resources are not used effectively, in some cases, in the deletion control by the operations of the conventional example 1, the operations of the conventional example 1 are used together with the operations of the conventional example 2.

On the other hand, if the operations of the examples 1 and 2 are used in combination, the operations for addition and deletion of the active set possibly occurs in series in a short time.

As shown in FIG. 8, when the propagation environment is preferable in the downlink radio channel but is not preferable in the uplink radio channel between the mobile terminal 110 and the base station 120, it causes the operations for addition and deletion of the active set in series because of the addition of the cell 121 to the active set in response to the radio channel setup request signal from the mobile terminal 110, and the deletion of the cell 121 from the active set in response to the radio channel release request signal from the base station 120. This results in the deletion and addition occurring in series in a short time.

SUMMARY OF THE INVENTION

The present invention solves the above-described problems in a communications system, a radio network controller and an active set control method for performing active set control with respect to each uplink high-speed signal between a mobile terminal and each base station.

According to the present invention, after deleting a cell from an active set, the radio network controller starts a timer for a predetermined period of time for inhibiting addition of an access link regarding the cell before expiration of the timer, whereby the addition and deletion of the access link are prevented from successive operation of the addition and deletion in a short time. Accordingly, it is made possible to prevent the deletion and addition of the cell from and to the active set from successive operations in a short time, under a propagation circumstance in which a receiving strength of an uplink high-speed signal is degraded, while a downlink signal receiving strength is sufficient for maintaining the access link of the cell in the active set.

BRIEF DESCRIPTION OF THE DRAWINGS

The above and other purposes, features and advantages of the present invention will be more apparent from the following detailed description when taken in conjunction with the accompanying drawings wherein.

DETAILED DESCRIPTION OF THE EXEMPLARY ASPECTS

Figure 1:
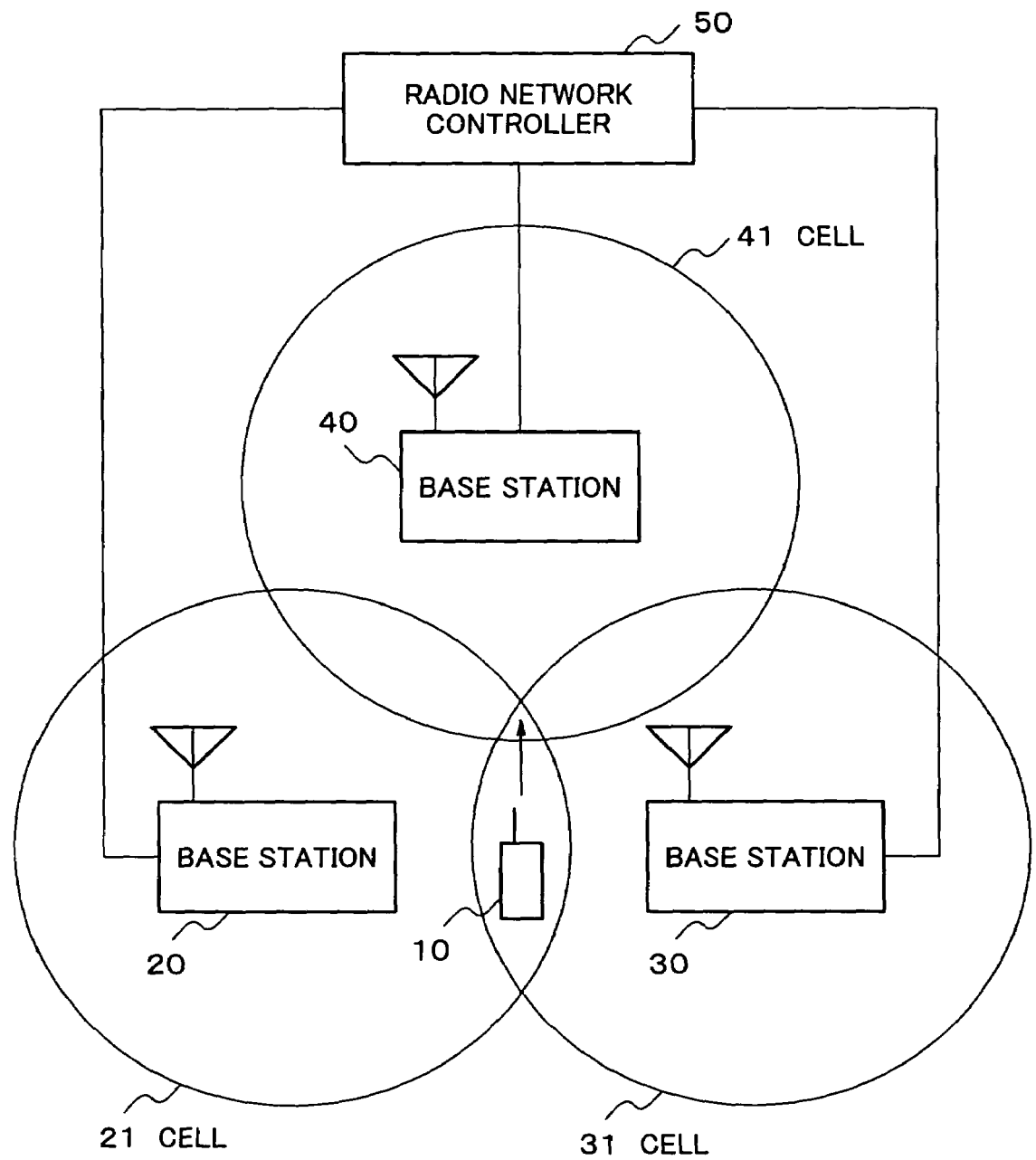
FIG. 1 is a first block diagram schematically showing a configuration of a mobile communications system, according to an exemplary aspect of the present invention.
Figure 2:
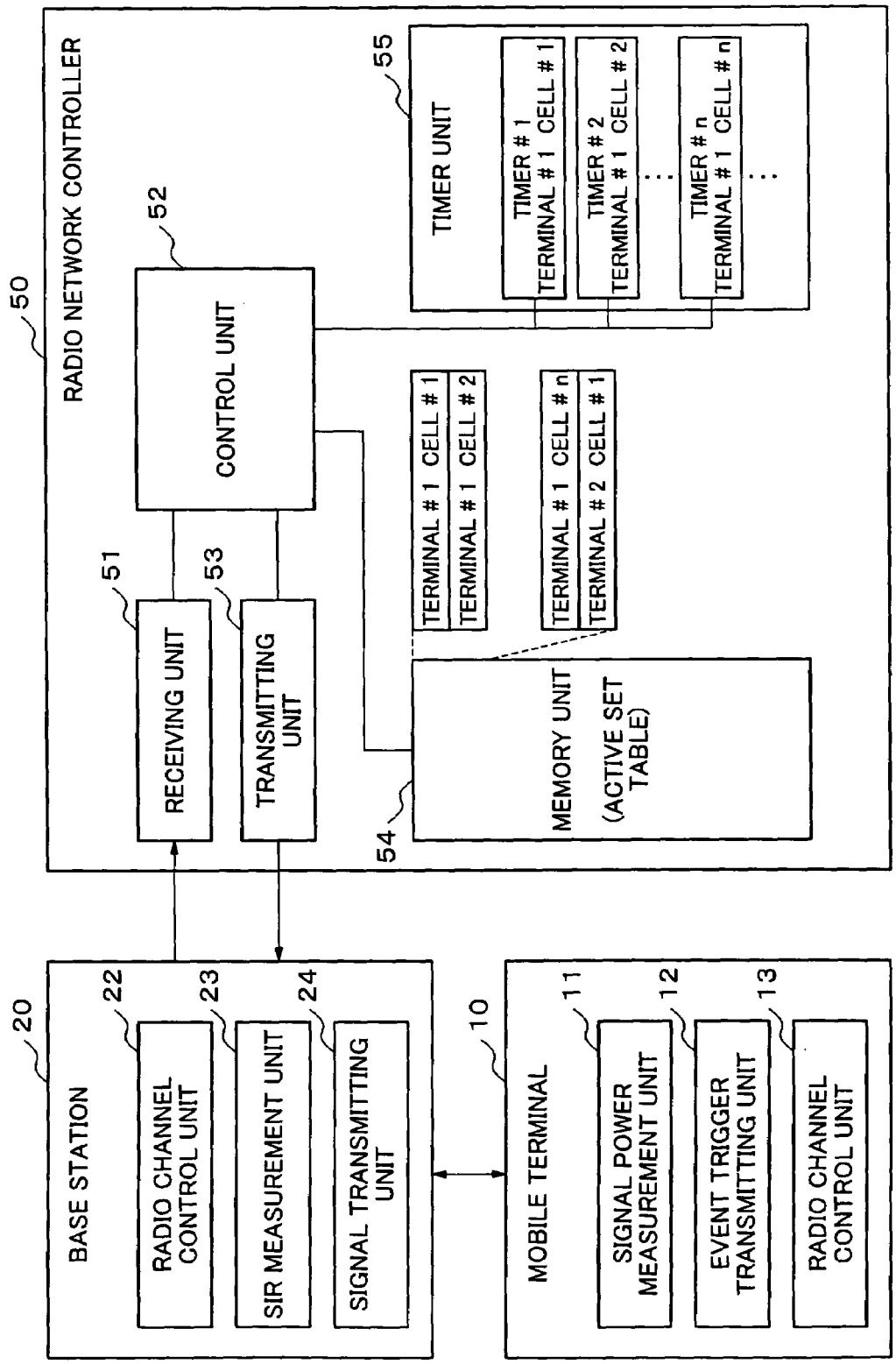
FIG. 2 is a second block diagram schematically showing the configuration of the mobile communications system, according to an exemplary aspect of the present invention.

A mobile communications system according to an exemplary aspect of the present invention will be described with reference to FIGS. 1 and 2. FIGS. 1 and 2 are block diagrams each showing a configuration of the communications system according to an exemplary aspect of the present invention. FIG. 1 shows an exemplary case in which a mobile terminal 10 which was in an overlapped area of two cells 21 and 31 moves into an overlapped area of three cells 21, 31 and 41. In FIG. 2, base stations 30 and 40 are omitted.

The exemplary communications system in FIG. 1 is a CDMA communications system including the mobile terminal 10, base stations 20, 30 and 40, and a radio network controller 50.

The mobile terminal 10 is a terminal capable of having a plurality of radio channels each connecting with any one of base stations 20 to 40, and can be, for example, a cellular telephone. As shown in FIG. 2, the exemplary mobile terminal 10 can include a signal power measurement unit 11, an event trigger transmitting unit 12 and a radio channel control unit 13.

While a radio channel is connecting to a first cell (for example, the cell 21), the signal power measurement unit 11 is capable of periodically measuring power of downlink reference signals of other neighboring cells, such as a second cell (for example, the cell 31).

When the down link reference signal power becomes higher than an active set addition threshold level (e.g., see FIG. 4), the event trigger transmitting unit 12 sends, to the radio network controller 50, an event trigger (a radio channel setup request signal) for adding the cell 31 to an active set through a radio channel of the cell 21. When the level of a downlink reference signal power of a first cell (for example, the cell 21) is lower than an active set deletion threshold level (e.g., see FIG. 4) because the mobile terminal 10 moves from the first cell to a second cell (for example, the cell 31), the event trigger transmitting unit 12 sends, to the radio network controller 50, an event trigger for deleting the first cell (the cell 21) from the active set through any one of existing radio channels between the mobile terminal 10 and the base stations 20 and 30.

The active set addition threshold level can be a threshold level for judging whether or not a concerned cell is added to the active set by comparing the level of a downlink reference signal power to the active set addition threshold level. The active set deletion threshold level can be a threshold level for judging whether or not a concerned cell is deleted from the active set by comparing the level of a downlink reference signal power to the active set deletion threshold level.

A radio channel control unit 13 sets up a radio channel of a cell (for example, cell 31) by receiving a radio channel setup signal (for instruction of setting up a radio channel of a cell, for example, the cell 31) from the radio network controller 50. Further, the radio channel control unit 13 releases a radio channel of a cell (for example, the cell 31), which channel has been set up, by receiving a radio channel release signal (for instruction of releasing a radio channel of a cell, for example, the cell 31) from the radio network controller 50.

Any one of the base stations 20 to 40 sets up a radio channel between itself and the mobile terminal 10 within their cells in response to a signal from the radio network controller 50. Here, a cell, for example, the cell 21 of the base station 20, indicates two things. First, the cell 21 indicates a communications area in which a mobile terminal is possible to communicate with the base station 20. Second, it indicates that the cell 21 is an access link corresponding to a radio channel between a mobile terminal and the base station 20 within the cell 21. In the second meaning, a cell is a target unit to be managed by the active set.

The base station 20 includes a radio channel control unit 22, a SIR measurement unit 23 and a signal transmitting unit 24. Each of the base stations 30 and 40 also can include the same configuration as the exemplary case of the base station 20.

The radio channel control unit 22 sets up a radio channel in a designated cell (for example, the cell 31) upon receiving a radio channel setup signal (for instruction of setting up of a radio channel of, for example, the cell 31) from the radio network controller 50. The radio channel control unit 22 releases an already-existing radio channel in a designated cell (for example, the cell 31) upon receiving a radio channel release signal (for instruction of release of a radio channel of, for example, the cell 31) from the radio network controller 50.

The SIR measurement unit 23 measures a received SIR (Signal to Interference power Ratio) of an uplink high-speed signal, and judges a receiving condition of the uplink signal based on the received SIR and a target SIR indicating a required level for satisfying communications quality provided by the radio network controller 50. More specifically, the SIR measurement unit 23 monitors whether or not the level of a received SIR becomes lower than the active set deletion SIR threshold level (e.g., see FIG. 4) continuously for a predetermined time (an active set deletion protection time; e.g., see FIG. 4). The active set deletion SIR threshold level is a level of value obtained by subtracting a correction value from the value of the target SIR. The active-set deletion protection time can be a protection time for determining whether or not deletion of the active set is performed or not.

When the level of the received SIR continuously is lower than the predetermined level (the active set deletion SIR threshold level; e.g., see FIG. 4) for the certain protection time, the signal transmitting unit 24 sends, to the radio network controller 50, the radio channel release request signal for requesting to release the radio channel, which is of the cell 21, for the uplink high-speed signal.

The radio network controller 50 is connected to each of the base stations 20 to 40, and controls hand over and radio channels setup for each of the base stations 20 to 40. The radio network controller 50 includes a receiving unit 51, a control unit 52, a transmitting unit 53, a memory unit 54, and a timer unit 55.

The receiving unit 51 receives information on a request of the addition/deletion of the active set (the event trigger, the radio channel setup request signal, and the radio channel release request signal) from the mobile terminal 10 or any one of the base stations 20 to 40.

The transmitting unit 53 sends information on setup/deletion of an access link (the radio channel setup signal, and the radio channel release signal) to instruct the mobile terminal 10 and any one of the base stations 20 to 40 to setup or release a radio channel as the result of operation of addition to/deletion from the active set performed by the control unit 52, which is to be described later, based on the request information on addition to/deletion from the active set which was sent from the mobile terminal 10 or any one of the base stations 20 to 40 and received at the receiving unit 51.

The memory unit 54 stores information of an active set table indicating a state of an active set for each of the mobile terminals. The active set holds the list of cells corresponding to access links which are connected in handover operation for each mobile terminal.

When a certain cell has been deleted from the active set based on the deletion request by any one of base stations 20, 30 and 40, the timer unit 55 counts a time from deletion of the cell until a predetermined period of time after which the radio network controller 50 accepts the addition request of the same cell to the active set again.

The control unit 52 performs control processing of the active sets for the respective mobile terminals based on the active set table stored in the memory unit 54, in response to the request of addition to/deletion from an active set (the event trigger, the radio channel setup request signal, and the radio channel release request signal) received by receiving unit 51 from the mobile terminal 10 or any one of the base stations 20 to 40.

For example, upon receiving an event trigger of the radio channel release request signal for deleting the cell 21 from the active set sent from the mobile terminal 10, the control unit 52 deletes, from the active set table stored in the memory unit 54, the cell 21 associated with the mobile terminal 10. Similarly, upon receiving the radio channel release request signal for releasing the radio channel of uplink high-speed signal of the cell 21 sent from the base station 20, the control unit 52 deletes, from the active set table stored in the memory unit 54, the cell 21 associated with the mobile terminal 10 using the radio channel.

After the above-described deletion operation on the active set, the control unit 52 further performs deletion operation of the actual radio channel corresponding to the cell having been deleted from the active set. The control unit 52 issues the radio channel release signal for releasing the radio channel of the uplink high-speed signal associated with the cell 21 which has been deleted from the active set table and sends it through the transmitting unit 53, to each of the mobile terminal 10 and the base station 20.

Further, after deleting the cell 21 from the active set table stored in the memory unit 54, as exemplarily shown in a flow chart of FIG. 4 to be described later, the control unit 52 inhibits re-addition of the same cell in a certain condition for a predetermined period of time counted by the timer unit 55.

Upon receiving the radio channel release request signal from the base station (for releasing a radio channel of uplink-high speed signal of a cell, for example, a cell # n) and deleting the cell from the active set table, the control unit 52 starts an unused timer of the timer unit 55 for counting elapsed time from the point of the deleting operation from the active set table up to a predetermined period of time. The control unit 52 associates the timer counting elapsed time with the cell #n of the mobile terminal 10.

Upon receiving an event trigger (a radio channel setup request signal for adding the cell # n to the active set) from the mobile terminal 10, the control unit 52 checks whether or not the cell #n of the mobile terminal 10 was deleted from the active set within a predetermined period of time by the timer of the timer unit 55. The control unit 52 also checks the number of cells associated with mobile terminal 10 in the active set table stored in the memory unit 54. If there is a timer counting for the cell #n of the mobile terminal 10 and it is not yet expired, and there are two or more cells of the mobile terminal 10 in the active set table, the control unit 52 inhibits operations for the addition of the cell # n to the active set, the addition having been requested by the mobile terminal 10.

If there is only one cell of the mobile terminal 10 in the active set table, the control unit 52 accepts the adding request and sends a radio channel setup signal for setting up a radio channel relating to the cell # n (for example, the cell 21) to a concerned base station (for example, the base station 20) and the mobile terminal 10, even if there is a timer of the cell #n associated with the mobile terminal 10 and it is not yet expired. At the same time, the control unit 52 clears all timers counting for cells associated with the mobile terminal 10 in the timer unit 55.

The clearing timer operation by the control unit 52 is to secure the number of cells for the mobile terminal 10. If the last cell of mobile terminal 10 is deleted from the active set, the mobile terminal 10 loses all of the radio channels to the mobile stations, and all of the connections for services. Therefore, if the remaining cell is the only one in the active set, the control unit 52 stops inhibiting operation to secure the number of cells and adds the cell to the active set by accepting the radio channel setup request. This control operation for securing cell numbers continues until one or more cells of the mobile terminal 10 is added. Therefore, all other timers corresponding to the mobile terminal 10 are to be cleared at the same time.

Figure 3:
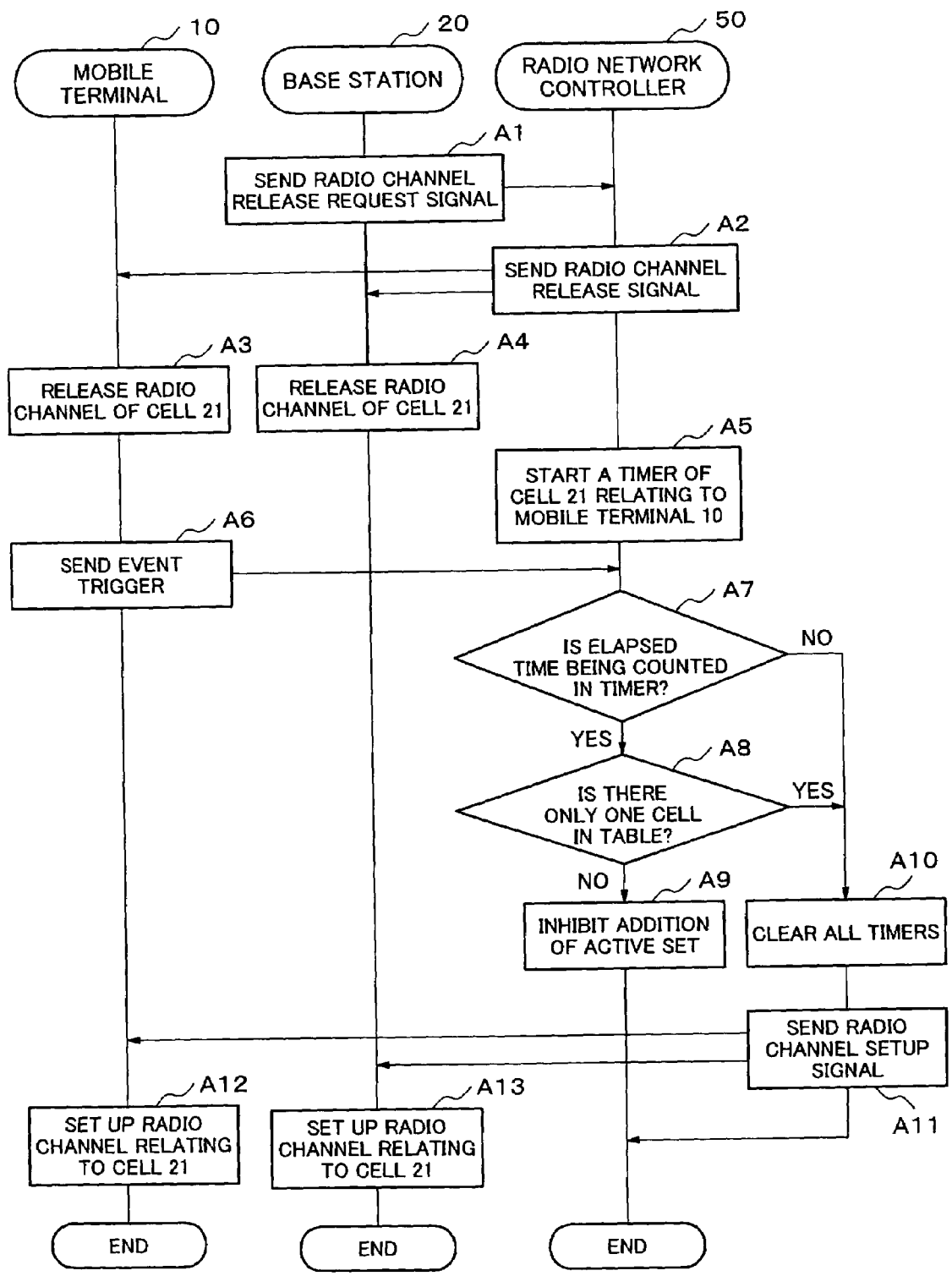
FIG. 3 is a flow chart schematically showing operations of the mobile communications system, according to an exemplary aspect of the present invention.

Next, operations of the mobile communications system, according to the exemplary aspects of the present invention, will be described with reference to FIG. 3. FIG. 3 is a flow chart schematically showing the operations of the mobile communications system according to the exemplary aspects of the present invention. FIG. 4 is a schematic view for explaining an example of control of addition to/deletion from the active set in the mobile communications system according to the exemplary aspects of the present invention.

Figure 4:
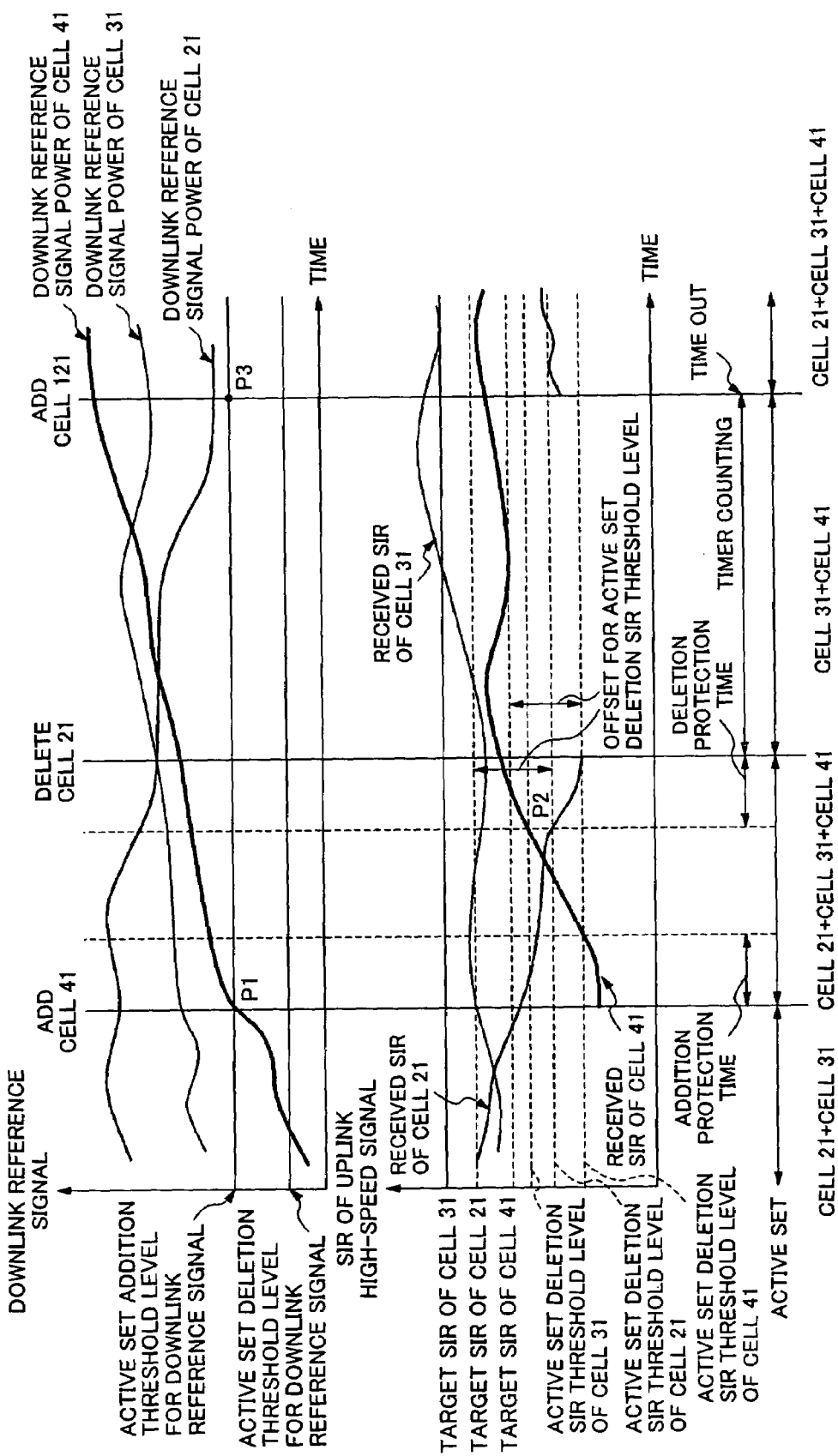
FIG. 4 is a schematic view for explaining an example of a control of addition/deletion of an active set in the mobile communications system, according to an exemplary aspect of the present invention.
Figure 5:
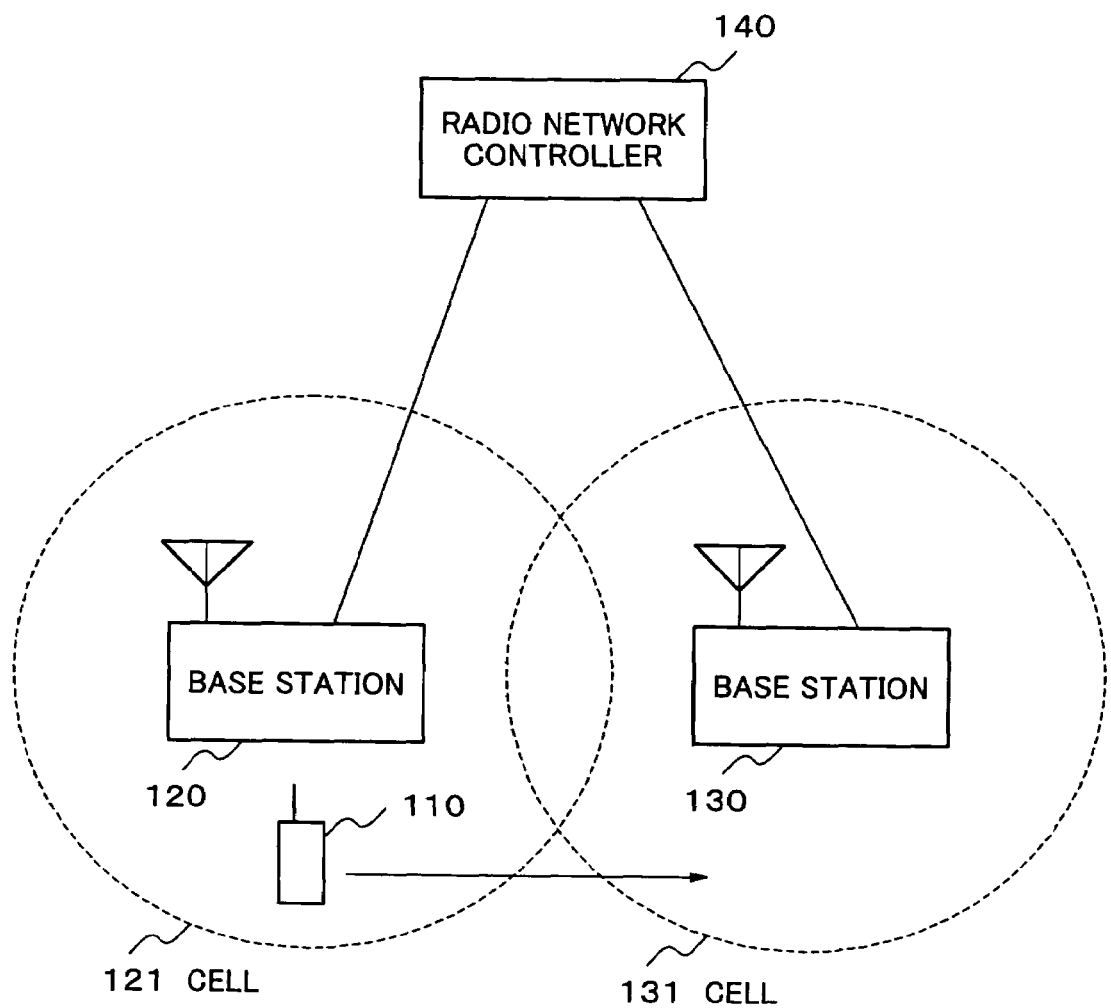
FIG. 5 is a block diagram schematically showing a configuration of a mobile communications system, according to a conventional example.
Figure 6:
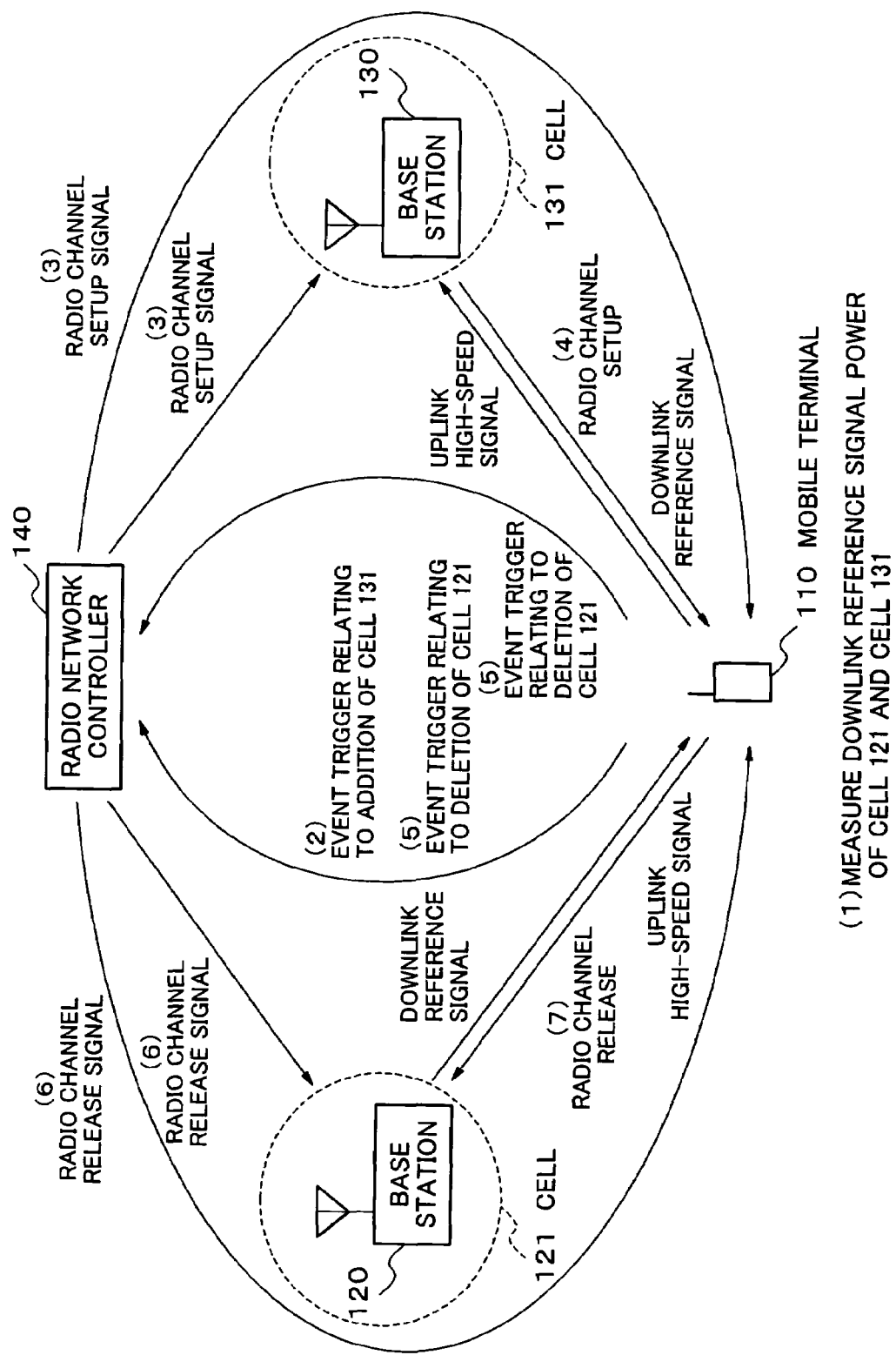
FIG. 6 is a schematic view for explaining operations of active set control in a CDMA mobile communications system, according to a first conventional example.
Figure 7:
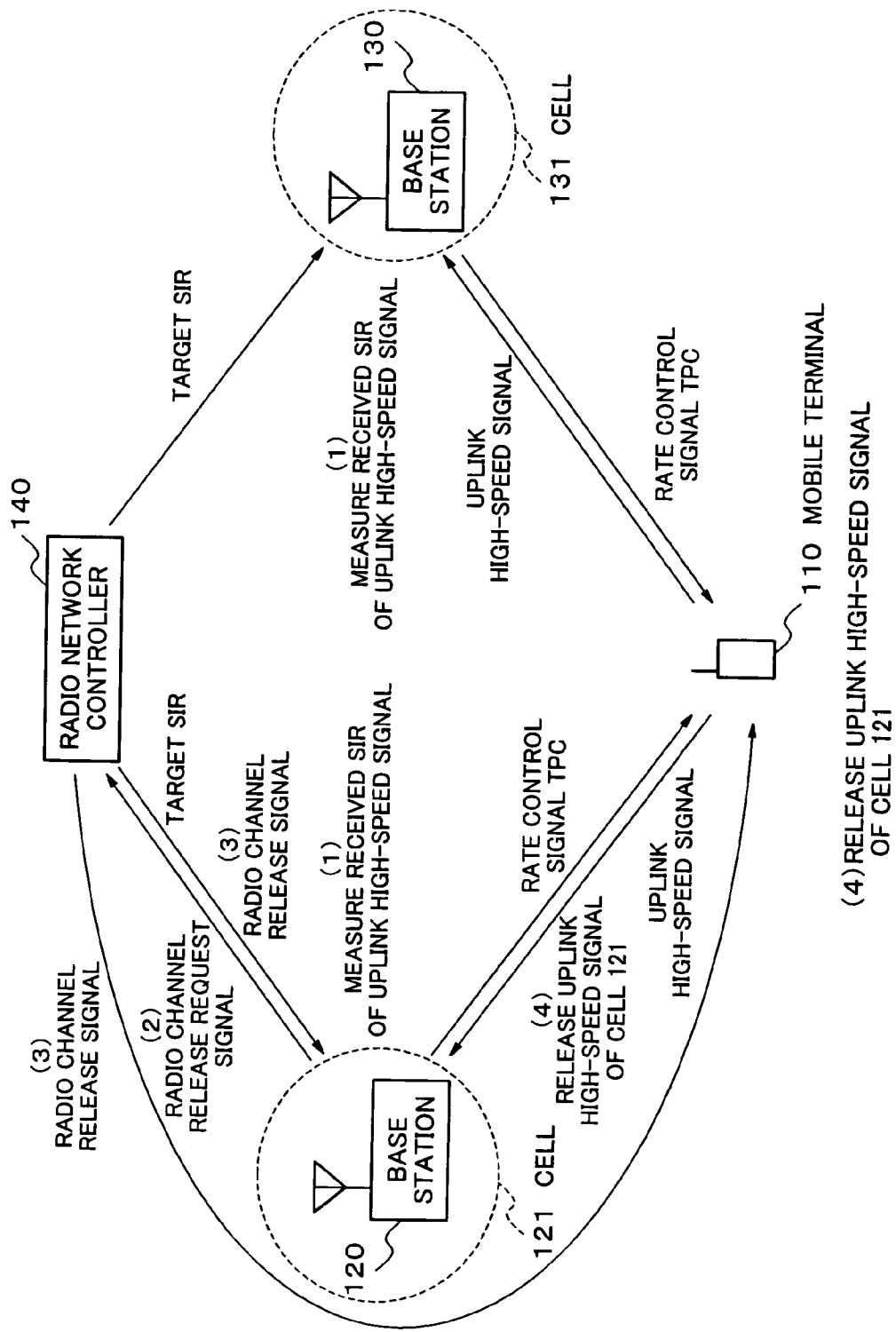
FIG. 7 is a schematic view for explaining operations of active set control in a CDMA mobile communications system, according to a second conventional example.
Figure 8:
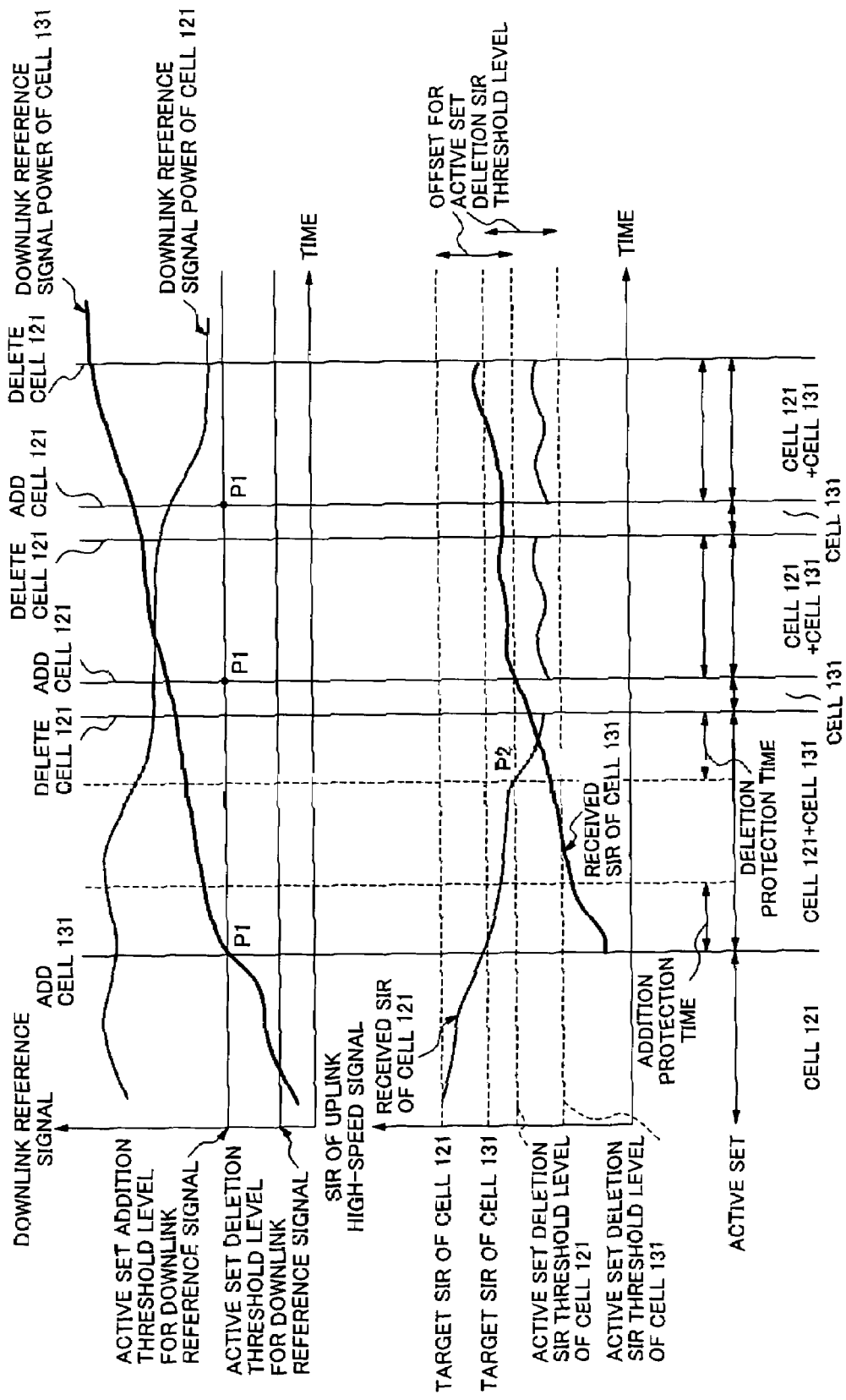
FIG. 8 is a schematic view for explaining an example of control of addition/deletion of an active set in a mobile communications system, according to the conventional example.

At the point of P2 in FIG. 4, the level of the received SIR of the uplink high-speed signal from the mobile terminal 10 at the base station 20 is lower than the active set deletion SIR threshold level. After the active set deletion protection time has elapsed in this state, the base station 20 sends the radio channel release request signal (for requesting the release of the radio channel of the uplink high-speed signal, which is a radio channel of the cell 21) to the radio network controller 50 (Step A1). Note that the radio channel release request signal may be the event trigger sent from the mobile terminal 10.

Upon receiving the radio channel release request signal from the base station 20, the radio network controller 50 sends, to the base station 20 and the mobile terminal 10, the radio channel release signal for requesting to release the radio channel of the uplink high-speed signal, which is the radio channel of the cell 21 (Step A2). The radio network controller 50 deletes the cell 21 corresponding to the radio channel from the active set of the mobile terminal 10 in the active set table.

Upon receiving, from the radio network controller 50, the radio channel release signal, the mobile terminal 10 releases the radio channel of the cell 21 being set up between the mobile terminal 10 and the base station 20 (Step A3). Further, upon receiving the radio channel release signal from the radio network controller 50, the base station 20 also releases the radio channel having being set up between the base station 20 and the mobile terminal 10 (Step A4). Then, the sequence of processing for deleting the cell 21 from the active set associated with the mobile terminal 10 is completed.

After sending the radio channel release signal (for deleting the cell 21 from the active set), the radio network controller 50 inhibits the cell addition to the active set relating to the mobile terminal 10 for a predetermined time. The control unit 52 starts a timer of the timer unit 55 associating with the cell 21 of the mobile terminal 10 and inhibits the addition the cell 21 of mobile terminal 10 to the active set table for a predetermined time (Step A5).

When the level of the downlink reference signal power of the cell 21, which power is measured by the mobile terminal 10, is higher than the active set addition threshold level (after the point of P1 as well as after the time P2 in FIG. 4), the mobile terminal 10 sends the event trigger (the radio channel setup request signal for adding the cell 21 to the active set) to the radio network controller 50 (Step A6 in FIG. 3).

Upon receiving the event trigger from the mobile terminal 10, the control unit 52 of the radio network controller 50 checks whether or not any timer of the cell 21 associated with the mobile terminal 10 is counting the time and if the timer is not yet expired (Step A7).

If there is a timer counting for the cell 21 of the mobile terminal 10 (YES in Step A7), the control unit 52 checks whether or not there is only one cell in the active set of the mobile terminal 10 in the active set table stored in the memory unit 54 (Step A8).

If the number of cells associated with mobile terminal 10 is more than one in the active set table (NO in Step A8), the control unit 52 inhibits the addition of the cell 21 of the mobile terminal 10 to the active set (Step A9). The inhibition operation from addition of the access link to the active set for a certain period of time prevents the addition/deletion operation to the active set at frequent intervals.

If there is not a timer counting for the cell 21 associated with the mobile terminal 10 (NO in Step A7), or the number of cells associated with the mobile terminal 10 is only one in the active set table (YES in Step A8), the radio network controller 50 resets all timers relating to the mobile terminal 10 in the timer unit 55 (Step A10).

As described above, in case of YES in Step A8, clearing all timers relating to the mobile terminal 10 in the timer unit 55 is to stop inhibiting the adding operation to the active set table and to secure the number of cells of the mobile terminal 10. In the case of NO in Step A7, clearing all timers similarly with in case of YES in Step A8 is also to secure the number of cells of the mobile terminal 10. In the case of NO in Step A7, the radio network controller 50 receives a request for setup of a radio channel other than radio channels which were deleted from the active set table before a predetermined period of time or shorter. Because the radio channel requested to be set up in the case of NO in Step A7 is the channel for which any timer does not count in the timer unit 55. In the case of NO in Step A7, the radio. network controller 50 stops inhibiting the adding operation of cells to the active set table and gives the mobile terminal 10 an opportunity to increase the number of cells in the active set in the radio network controller 50 expecting that the radio channel condition around the mobile terminal 10 is changed for the better.

After clearing all timers relating to the mobile terminal 10 in the timer unit 55 (Step A10), the radio network controller 50 sends, to the concerned base station 20 and the mobile terminal 10, the radio channel setup signal for setting up the radio channel corresponding to the cell 21 of the mobile terminal 10 (Step A11).

Upon receiving the radio channel setup signal (for setting up the radio channel of the uplink high-speed signal of the cell 21) from the radio network controller 50, the mobile terminal 10 sets up the radio channel of the cell 21, between the mobile terminal 10 and the base station 20 (Step A12). Upon receiving the radio channel set up signal (for setting up the radio channel of the uplink high-speed signal, which radio signal relates to the cell 21) from the radio network controller 50, the base station 20 sets up the radio channel of the cell 21, between the base station 20 and the mobile terminal 10 (Step A13). Then, the sequence of operations for adding the cell 21 to the active set relating to the mobile terminal 10 is completed.

In the above description of operations of the mobile communications system according to the exemplary aspects of the present invention, with reference to FIG. 3, the sequence can be for the case in which the base station 20 sends the radio channel release request signal to the radio network controller 50 (Step A1) and then the mobile terminal 10 sends the event trigger (the radio channel setup request signal for adding the cell 21 to the active set) to the radio network controller 50 (Step A6). If the mobile terminal 10 sends the event trigger (the radio channel release request signal) in Step A1, the radio network controller 50 performs similar operations after Step A1 with the above exemplary description of FIG. 3. Also, if the base station 20 sends the radio channel release request signal in Step A6, the radio network controller 50 also performs similar operations after Step A6 with the above exemplary description of FIG. 3. The radio network controller 50 performs the inhibiting operation based not on whether the mobile terminal or one of the base stations sends the request for setting up or releasing a radio channel, but instead, based on the cell number corresponding to the radio channel, the relating mobile terminal, the interval time between deletion/addition operations of the concerned cell, and the number of cells remaining in the active set of the mobile terminal.

Note that, with respect to the control of addition to/deletion from the active set in the above-described exemplary aspects of the communications system, the explanations are given for the operations between the mobile terminal 10, the base station 20 and the radio network controller 50. However, the ordinarily skilled artisan would know and understand that is the exemplary aspects are applicable to operations between the mobile terminal 10, the base station 30 and the radio network controller 50, or between the mobile terminal 10, the base station 40 and the radio network controller 50.

According to the exemplary aspects, after deleting a cell from the active set, the radio network controller 50 sets a timer for inhibiting the addition of an access link of the cell until the timer is expired, thereby preventing instability in the addition/deletion of the access link. Accordingly, according to the exemplary aspects of the present invention, it is made possible to prevent the radio network controller from frequently performing the operation of deletion and addition of the cell from and to the active set, in the case that the receiving condition of the uplink high-speed signal is deteriorated while the downlink signal power is preferable. For this reason, according to the exemplary aspects of the present invention, it is made possible to avoid the problem caused by the difference between the uplink propagation environment and the downlink propagation environment.

Note that, according to the exemplary aspects of the present invention, it is possible to prevent the active set from the frequent operation caused not only by the difference between the uplink propagation environment and the downlink propagation environment, but also, by any other reasons, because the inhibiting operation does not depend on the cause of adding/deleting operation to the active set and works without distinction of the cause of the frequent operations.

By preventing the frequent addition and deletion operations of the access link, it is made possible to prevent the hardware of a radio network controller from performing unnecessary operations and to achieve effective use of radio resources by repressing unnecessary active set control signals on the radio channels.

While this invention has been described in connection with certain exemplary aspects, it is to be understood that the subject matter encompassed by way of this invention is not to be limited to those specific exemplary aspects. On the contrary, it is intended for the subject matter of the invention to include all alternatives, modifications and equivalents as can be included within the spirit and scope of the following claims.

Further, it is the inventor's intent to retain all equivalents of the claimed invention even if the claims are amended during prosecution.

This application is based on Japanese Patent Application No. JP 2005-99572 filed on Mar. 30, 2005, and including a specification, claims, drawings and summary. The disclosure of the above Japanese Patent Application is incorporated herein by reference in its entirety.

What is claimed is:

1. A mobile communications system including a mobile terminal, a plurality of base stations each of which sets up a radio channel to the mobile terminal, and a radio network controller which is connected to each of the base stations and includes an active set for the mobile terminal, which shows a list of cells in which the radio channel is being established to the mobile terminal for handover, said mobile communication system wherein:
   said mobile terminal transmits a radio channel setup request, when detecting signal power of a downlink reference signal from a neighboring cell is higher than an active set addition threshold level, for requesting to establish the radio channel in the neighboring cell and to add the neighboring cell to the active set of the mobile terminal;
   said base station transmits a radio channel release request, when degradation of communication quality of an uplink signal from the mobile terminal is detected in a predetermined condition, for requesting to release the radio channel from the mobile terminal in own cell and to delete own cell from the active set of the mobile terminal;
   said radio network controller, by receiving the radio channel release request, releases the radio channel for the mobile terminal in the cell which relates to the radio channel release request and deletes the cell from the active set of the mobile terminal, and then, upon receiving the radio channel set up request from the mobile terminal, ignores the radio channel set up request if the radio channel setup request relates to the same cell which has been deleted from the active set of the same mobile terminal transmitting the radio channel setup request and if the radio channel setup request is received before a predetermined time has elapsed after deletion of the cell from the active set; and
   wherein, after the radio network controller has deleted the cell from the active set of the mobile terminal by the radio channel release request from the base stations, and then, upon receiving the radio channel set up request from the mobile terminal, the radio network controller accepts the radio channel setup request and sets up the radio channel based on the radio channel set up request and adds the cell to the active set of the mobile terminal if the radio channel set up request is received after the predetermined time has elapsed after deletion of the cell from the active set even though the radio channel setup request relates to the same cell which has been deleted from the active set of the same mobile terminal transmitting the radio channel setup request.

2. The mobile communications system according to claim 1, wherein, after the radio network controller has deleted the cell from the active set of the mobile terminal due to the radio channel release request from the base station, and then, upon receiving the radio channel set up request from the mobile terminal, the radio network controller accepts the radio channel setup request and sets up the radio channel based on the radio channel set up request and adds the cell to the active set if a number of cells in the active set of the mobile terminal is only one even though the radio channel setup request relates to the same cell which has been deleted from the active set of the same mobile terminal transmitting the radio channel setup request and even though the radio channel setup request is received before the predetermined time has elapsed after deletion of the cell from the active set.

3. A radio network controller which is connected to each of base stations in a mobile communication system, comprising:
   a plurality of active sets for each of mobile terminals, each of which shows a list of cells in which a radio channel is being set up to the mobile terminal for handover; and
   a control unit which, by receiving a radio channel release request from the base station which has detected degradation of communication quality of an uplink signal from the mobile terminal in a predetermined condition, releases the radio channel far the mobile terminal in the cell which relates to the radio channel release request and deletes the cell from the active set of the mobile terminal, and then, upon receiving a radio channel setup request from the mobile terminal which has detected signal power ate downlink reference signal from the cell being higher than an active set addition threshold level, ignores the radio channel setup request if the radio channel setup request relates to the same cell which has been deleted from the active set of the same mobile terminal transmitting the radio channel setup request and if the radio channel setup request is received before a predetermined time has elapsed after deletion of the cell from the active set,
   wherein the control unit accepts the radio channel setup request if the radio channel setup request is received after the predetermined time has elapsed after deletion of the cell from the active set although the radio channel setup request relates to the same cell which has been deleted from the active set of the same mobile terminal transmitting the radio channel set up request.

4. The radio network controller according to claim 3, further comprising:
   a timer unit which includes a plurality of timers each of which counts a predetermined time by a control of the control unit,
   wherein the control unit starts one of the timers for a deleted cell and the corresponding mobile terminal when the cell is deleted from the active set of the mobile terminal, and then, upon receiving the radio channel set up request for the same cell and the same mobile terminal, ignores the radio channel setup request if the timer provided for the same cell and the same mobile terminal has not completed to count the predetermined time.

5. The radio network controller according to claim 4, wherein the control unit, upon receiving the radio channel setup request for the same cell and the same mobile terminal accepts the radio channel setup request if a number of cells in the active set of the mobile terminal is only one, even though the radio channel setup request relates to the same cell and the same mobile terminal, and even though the timer provided for the same cell and the same mobile terminal has not completed to count the predetermined time.

6. The radio network controller according to claim 3, further comprising:
  a timer unit which includes a plurality of timers each of which counts a predetermined time by a control of the control unit,
  wherein the control unit starts one of the timers for a deleted cell and the corresponding mobile terminal when the cell is deleted from the active set of the mobile terminal, and then, upon receiving the radio channel set up request for the same cell and the same mobile terminal, accepts the radio channel setup request if the timer provided for the same cell and the same mobile terminal has completed to count the predetermined time even though the radio channel setup request relates to the same cell end the same mobile terminal transmitting the radio channel setup request.

7. An active setup control method,
in a radio network controller which is connected to each of base stations in a mobile communication system and which includes a plurality of active sets for each of mobile terminals, which shows a list of cells in which a radio channel is being set up to the mobile terminal for, the active set control method comprising:
  receiving a radio channel release request from the base station which has detected a degradation of communication quality of an uplink signal from the mobile terminal in a predetermined condition;
  releasing the radio channel for the mobile terminal in the cell which relates to the radio channel release request and deleting the cell from the active set of the mobile terminal;
  receiving a radio channel set up request from the mobile terminal which has detected signal power of a downlink reference signal from the cell being higher than an active set addition threshold level;
  ignoring the radio channel setup request if the radio channel setup request relates to the same cell which has been deleted from the active set of the same mobile terminal transmitting the radio channel setup request, and if the radio channel setup request is received before a predetermined time has elapsed after deletion of the cell from the active set; and
  accepting the radio channel setup request if the radio channel setup request is received after the predetermined time has elapsed after deletion of the cell from the active set, even though the radio channel setup request relates to the same cell which has been deleted from the active set of the same mobile terminal transmitting the radio channel setup request.

8. An active setup control method
in a radio network controller which is connected to each of base stations in a mobile communication system and which includes a plurality of active sets for each of mobile terminals, which shows a list of cells in which a radio channel is being set up to the mobile terminal for, the active set control method comprising:
  receiving a radio channel release request from the base station which has detected a degradation of communication quality of an uplink signal from the mobile terminal in a predetermined condition;
  releasing the radio channel for the mobile terminal in the cell which relates to the radio channel release request and deleting the cell from the active set of the mobile terminal;
  receiving a radio channel set up request from the mobile terminal which has detected signal power of a downlink reference signal from the cell being higher than an active set addition threshold level;
  ignoring the radio channel setup request if the radio channel setup request relates to the same cell which has been deleted from the active set of the same mobile terminal transmitting the radio channel setup request, and if the radio channel setup request is received before a predetermined time has elapsed after deletion of the cell from the active set, set; and
  accepting the radio channel setup request if a number of cells in the active set of the mobile terminal is only one, even though the radio channel setup request relates to the same cell which has been deleted from the active set of the same mobile terminal transmitting the radio channel setup request and even though the radio channel setup request is received before the predetermined time has elapsed after deletion of the cell from the active set.

* * * * *